June 24, 1969
M. METH
3,451,797
METHOD OF TEMPERING GLASS
Filed April 12, 1966
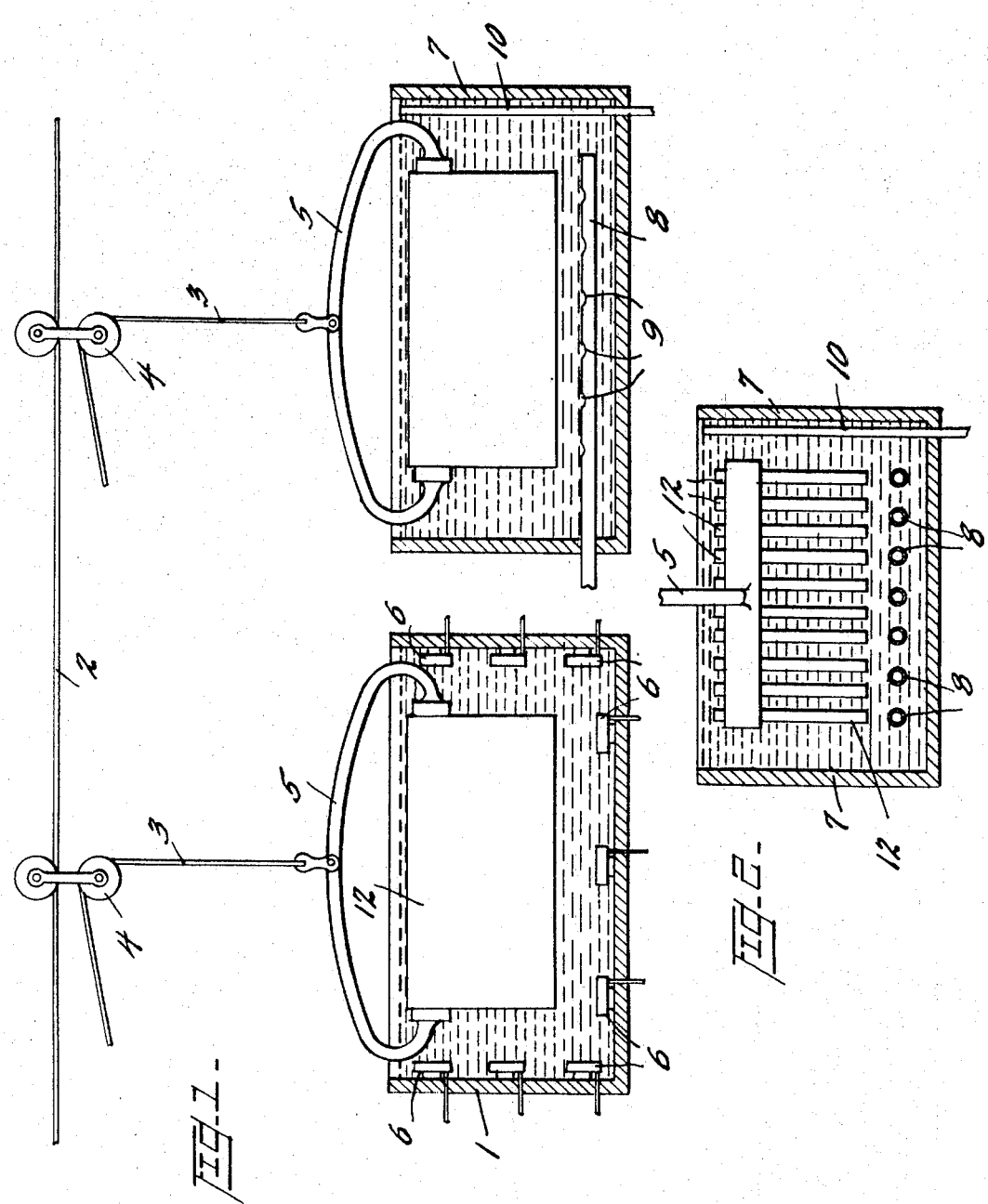
INVENTOR.
Max Meth,
BY
ATTORNEY United States Patent Office 3,451,797
Patented June 24, 1969

3,451,797
METHOD OF TEMPERING GLASS
Max Meth, 2 S. Montgomery Ave.,
Atlantic City, N.J. 08401
Filed Apr. 12, 1966, Ser. No. 542,067
Int. Cl. C03b 27/00
U.S. Cl. 65—116                                    4 Claims

ABSTRACT OF THE DISCLOSURE

A method of tempering glass in which the article at ambient temperatures is immersed in molten metal maintained at a critical temperature in the range between 2000° F. and 2300° F. and held in said metal until the glass has reached a temperature immediately below its bending point, the glass being removed and subjected to rapid cooling.

---

This invention relates to a method of tempering glass and has for its object to provide a method which will operate reliably and effectively with much simpler equipment to produce a more uniform product and hence to reduce the substantial percentage of rejects as occur in presently used methods.

Conventionally, glass sheets are carried by conveyors in single tandem through a furnace where they are heated to a temperature just at or immediately below the bending point, then as the sheets leave the furnace they are subjected to air blasts by a series of nozzles which cool them very rapidly. Elaborate controls are provided to sense the exact temperature and great precautions are taken to assure uniformity of contact of the cooling air with the sheets. The equipment is large and very expensive and, even so, the percentage of rejects is large.

An object of this invention is to treat the glass sheets in batches by immersing the sheets in a first vat for heating and in a second vat for cooling. I am thus enabled to obtain better controls over smaller equipment.

A principal object is to provide a first vat containing molten metal in which the sheets are dipped for the purpose of bringing them to a temperature at or immediately below that at which the glass will bend, removing them from the molten metal and immediately inserting them in a second vat or container in which air, low temperature steam or other vapor is introduced in such large quantities that uniform cooling results. The glass sheets will attain a temperature of 1150°–1400° F., and the time of immersion will depend on the thickness of the sheets, usually one to five minutes. The use of a molten metal dip is novel in this field and becomes possible by reason of my discovery that glass sheets may be expected to and will ordinarily crack or shatter when immersed in molten metal but that, for some reason unknown to me, if the temperature of the molten metal is maintained between 2000° F. and 2300° F., glass of the type used by the industry for automobile windows and windshields, will not crack but will accept progressive heating through the thickness thereof until the required temperature has been reached, whereupon the sheets may be withdrawn and subjected to cooling.

The molten bath lends itself to batch treatment of sheets much better than to equipment as would be necessary for individual immersion of the sheets. Then, since batch heating is used, it follows that batch cooling should be provided also. It thus becomes possible in batch cooling to employ any fluid including air or a medium other than air, such as steam, or other vapor or a liquid.

The invention will be better understood with reference to the accompanying drawing in which FIGURE 1 is a longitudinal, vertical section through the two vats with glass sheets suspended therein, and FIGURE 2 is a transverse vertical section through the cooling vat.

I provide a vat 1 of suitable size. For example, it may be a size to receive a batch of ten sheets 12 of 4′ x 8′ dimension which can be lowered thereinto by a conveyor 2, a cable 3, a pulley 4 and clamps 5. The vat may be made of stainless steel or ceramic or other suitable material and equipped with electrodes 6 so that the contained metal can be melted therein and maintained at the correct temperature. The metal may be any metal or alloy which will melt below 2000° F. I have used lead, tin, zinc and several ferrous alloys. There may be some residual adhesion of metal particles to the glass surface particularly by the metals having the lower boiling points so that the particles may have to be brushed from the surface in those cases.

While the cooling may then be done by the conventionally used air nozzles, I prefer to provide a second vat 7 into which the sheets are immediately inserted.

This vat 7 is illustrated in highly diagrammatic form and is intended to illustrate any kind of vat or container in which the glass may be immersed in a liquid, or subjected to low temperature steam or other vapor or to a flow of air. Thus a feed line 8 may be connected to a source of water supply and flow water into the vat through the orifices 9 and outwardly through one or more overflow pipes 10.

When the inlet pipe 8 is used to inlet steam or other vapors through the orifices 9 it is contemplated that the vat 7 will be open at the top. The overflow pipe 10 in this case would be shortened to prevent accumulation of water above the inlets or orifices 9.

When the inlet pipe 8 is used to admit air it will be of larger size than when used for liquids and will be fed by a blower. The number of orifices will be substantially increased so that the sheets will be subjected to a very large volume of cooling air enveloping the sheets to obtain uniform cooling. In this case the vat 7 will be open at the top and the overflow pipe 10 will not be needed.

What I claim is:

1. The method of tempering glass which consists in providing a vat of molten metal, in maintaining the temperature of the metal between 2000° F. and 2300° F., in immersing the glass at ambient temperature into said molten metal and holding it therein until it has attained a temperature at or immediately below its bending point, in then removing said glass from said vat and in subjecting said glass to rapid cooling.

2. The method as described in claim 1 in which the glass is in sheet form and is presented to the molten metal in batches.

3. The method as described in claim 1 in which the glass is presented to the molten bath in the form of sheets in batches and thereafter subjected to rapid cooling by large volumes of air.

4. The method as described in claim 1 in which said glass immersed in said molten metal is in the form of sheets in a batch, and said rapid cooling is accomplished in a second vat containing a fluid cooling medium.

References Cited

UNITED STATES PATENTS

| | | | |
|---|---|---|---|
| 178,797 | 6/1876 | O'Neill | 65—116 |
| 2,052,254 | 8/1936 | Shaver | 65—116 |
| 2,194,730 | 3/1940 | Wilson | 65—116 |

DONALL H. SYLVESTER, *Primary Examiner.*

ARTHUR D. KELLOGG, *Assistant Examiner.*

U.S. Cl. X.R.

65—104, 117, 389